Patented Nov. 7, 1922.

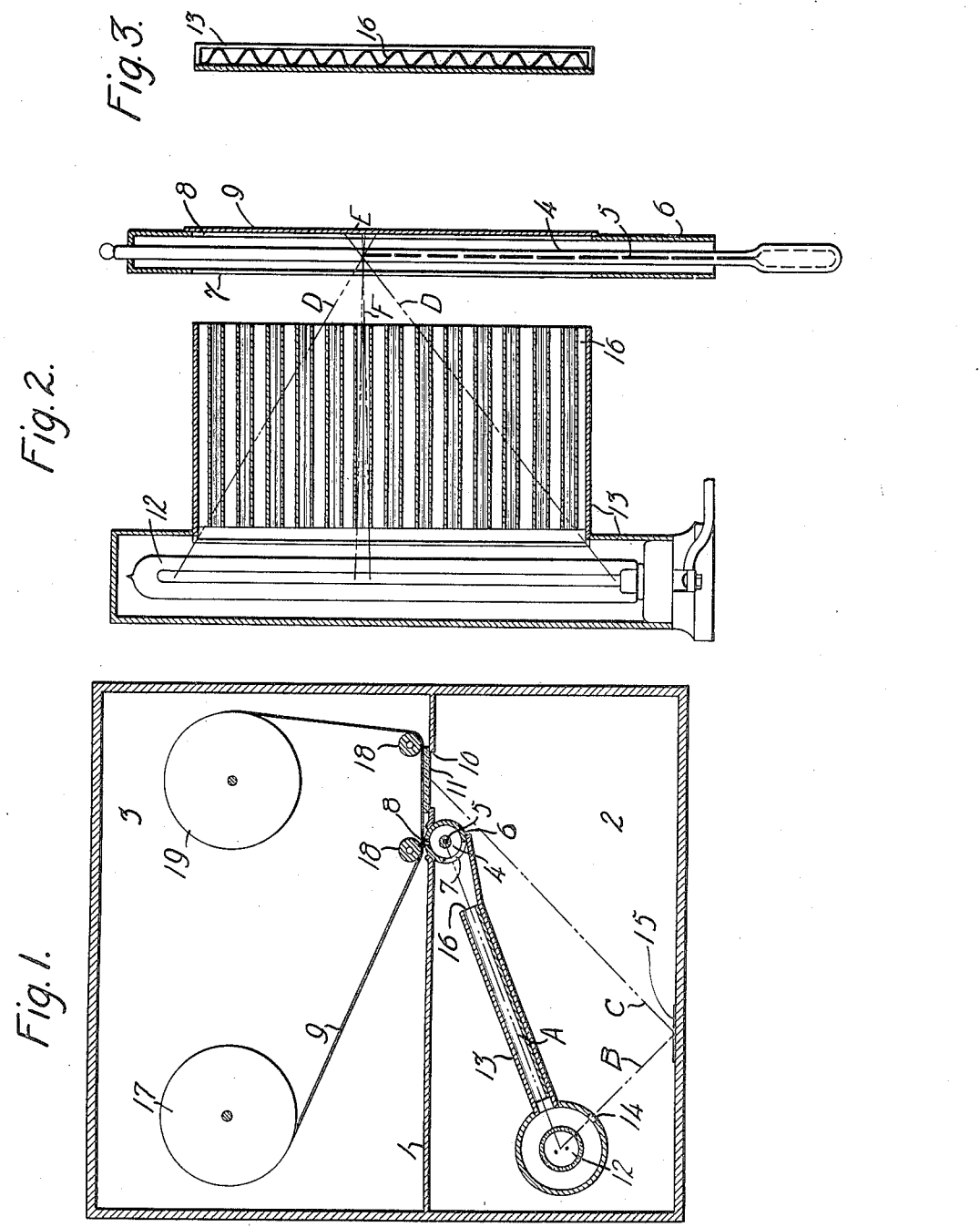

1,434,862

UNITED STATES PATENT OFFICE.

CLYDE H. WHEELER, OF MIDLAND PARK, NEW JERSEY, ASSIGNOR TO WESTERN ELECTRIC COMPANY, INCORPORATED, OF NEW YORK, N. Y., A CORPORATION OF NEW YORK.

ILLUMINATING APPARATUS.

Application filed July 2, 1921. Serial No. 482,035.

*To all whom it may concern:*

Be it known that I, CLYDE H. WHEELER, a citizen of the United States, residing at borough of Midland Park, in the county of Bergen, State of New Jersey, have invented certain new and useful Improvements in Illuminating Apparatus, of which the following is a full, clear, concise, and exact description.

This invention relates to illuminating apparatus and particularly to a method of propagating light in parallel rays without the use of lenses.

In using various types of optical apparatus it is usually desirable to obtain clearly defined images, and this result is practically always accomplished through the use of lenses. In photography, and particularly in recorders used in connection with psychrometers and other apparatus requiring a great degree of accuracy, a perfect print is essential in order to obtain correct data as to the object on test. Such an instrument is described, for example, in an application of D. T. May, Serial No. 483,393, filed July 9, 1921, which relates to a photographic recorder for determining humidity conditions and which consists in the formation of an image of the top of the indicating column of a thermometer, the light rays being passed through the thermometer tube in such a manner as to be intercepted in that part of the tube occupied by the liquid and to pass through that part of the tube above the liquid. A sensitized paper placed adjacent the tube and on the side opposite to the entrance of the rays will therefore show an image of that part of the tube through which the rays pass, and the lower end of this image will be the top of the indicating column which indicates the temperature. This image may best be recorded by obtaining only parallel vertical rays of light since divergent light rays passing through the walls of the thermometer are deflected over a wide area of the photographic chart and tend to obscure the image.

It is an object of this invention to provide a method of securing parallel rays of light without the use of lenses.

In accordance with its object the invention contemplates producing parallel light rays by the introduction of a sheet of corrugated material in a rectangular tube through which rays from a source of light must pass. The corrugated sheet serves to establish a plurality of barriers for divergent rays of light to produce parallelism in the emitted rays, the degree of parallelism being dependent upon the proximity and length of the convolutions of the sheet. The invention is particularly suited for use in the above-mentioned application of D. T. May, and its application to this device is considered in detail in the following description and in the accompanying drawing.

In the drawing, Fig. 1 is a top sectional view showing the application of the invention to the transmission of light in a photographic recorder; Fig. 2 is an enlarged front sectional view of the apparatus in its preferred form; and Fig. 3 is a front section of the rectangular tube containing the corrugated sheet.

Referring to the drawing, 1 represents the partition separating the chambers 2 and 3. A thermometer 4 having a bore 5 and surrounded by the metal shielding tube 6 is mounted in front of the partition, the metal tube being attached to the partition by a light tight joint. The tube 6 is provided with two openings extending longitudinally over the portion of the thermometer scale which it is desired to record. The opening 7 covers about 90° of the circumference of the tube 6; and the opening 8 is a slit of a width about equal to the diameter of the bore 5. The partition 1 is provided with openings similar to and coinciding with the slit 8 and on the opposite side of the partition passes the photographic chart 9. The partition is also provided with an opening 10 before which is attached a transparent screen 11 provided on its edge with a scale identical to the calibration of the adjacent thermometer. At an angle preferably of 22½° with the partition is located a source of light 12 having a shield 13 which surrounds the lamp and projects in toward the thermometer, thus providing approximately parallel rays transversely of the thermometer. The light for recording the height of the indicating column passes along the line A and thence through the openings to the chart 9. The light for recording the scales passes through the opening 14 in the shield 13 along the line B to a suitable reflecting surface 15 on the inside wall of the compartment 2 and thence is reflected along the line C to the screen 11.

In order to obtain a correct reading with the above described apparatus, it is essential that the height of the indicating column of the thermometer 4 be recorded with the greatest accuracy. In order that an accurate and well-defined image of the indicating column may be obtained it is necessary that the vertical rays of light be approximately parallel; or in other words, the light from the source 12, passing along the line A within the shield 13 must be propagated in parallel rays in order that the rays which pass through the thermometer at a given point may be fixed at a corresponding point on the adjacent photographic chart. In accordance with the invention this is accomplished by placing within the sides of the shield 13 a strip of corrugated material, such as sheet metal, shown at 16. The corrugated sheet 16 serves to establish a plurality of barriers for divergent rays of light and allows only parallel or substantially parallel rays to pass through. By decreasing the size of the corrugations, and by increasing their length, fewer light rays will be allowed to pass through the passages and greater accuracy will be obtained. The invention is not, however, limited to the use of corrugated material, it being possible to employ a plurality of rectangular or circular conduits disposed in the proper planes. The invention is shown more clearly in Fig. 2, in which converging rays of light D are shown passing through the walls of the thermometer 4 at the top of the indicating column when the corrugated sheet 16 is not employed. The resulting image upon the photographic chart 9 is a dense line extending over a length E sufficient to obscure the true height of the indicating column. When the corrugated strip 16 is placed within the shield 13, however, light rays D striking any portion of the corrugations are deflected and do not reach the thermometer. Light rays F which pass through the passages provided by the corrugations strike the thermometer and photograph chart at substantially right angles thereto, thus producing an accurate image of the top of the indicating column of the thermometer.

In the rear chamber 3 of the recording apparatus the chart 9 passes from the spool 17 over the rollers 18 or other means employed to keep it flat against the partition, to the spool 19 which may be rotated in any suitable manner.

What is claimed is:

1. The combination with a source of light of an object to be illuminated, a shield for said source of light conforming to the shape of said object, and a sheet of corrugated material disposed in said shield and adapted to intercept divergent light rays.

2. The combination with a source of light of an object to be illuminated, a shield for said source of light, an outlet for the light rays conforming to the shape of said object, and a sheet of corrugated material disposed in said outlet and adapted to intercept divergent light rays.

In witness whereof, I hereunto subscribe my name this 29th day of June, A. D., 1921.

CLYDE H. WHEELER.